Patented Aug. 28, 1928.

1,682,249

UNITED STATES PATENT OFFICE.

FRANK H. RIDDLE, OF DETROIT, MICHIGAN, ASSIGNOR, BY MESNE ASSIGNMENTS, TO CHAMPION PORCELAIN COMPANY, OF DETROIT, MICHIGAN, A CORPORATION OF MICHIGAN.

REFRACTORY WARE.

No Drawing.    Application filed November 29, 1920. Serial No. 427,137.

My invention has for its object to provide a refractory ware that has high heat conductivity and yet one which, when subjected to high temperatures, will not be readily deformed. It particularly has for its object to provide a refractory body that may be used in kilns and furnaces for supporting or containing ceramic materials that are to be subjected to a high temperature, that is, at a temperature at which refractory products made of clay will deform or develop internal strains and stresses. Also by reason of the high thermal conductivity of the refractory ware it will readily conduct heat to ceramic bodies that may be placed in or on the ware and located in kilns or furnaces for the purpose of burning the ceramic bodies. The heat of the kiln will thus be readily conducted to the ceramic bodies. My invention thus provides a body that may be used for a great variety of purposes, such as for furnace linings, muffles, saggers, tanks, or kiln furniture.

Heretofore it has been common in the art to form refractory bodies, such as brick for kilns and furnaces, or the like, of clay, ganister, magnesite, carborundum and similar materials. My invention, provides ceramic compositions for refractory ware which are composed largely of electrically reduced synthetically prepared sillimanite $3Al_2O_3 2SiO_2$ or the natural sillimanite $Al_2O_3SiO_2$. In forming the raw batch of the refractory ware I use clay, organic material or similar binders. Where clay is used as a binder sufficient alumina may be added to the mixture so that the clay will eventually unite chemically with the alumina to form artificial sillimanite so that the ultimate product will all be sillimanite.

Sillimanite, is not only refractory, but also has other valuable properties such as a low thermal coefficient of expansion, a high heat conductivity, a high deformation temperature and is not affected by reducing or oxidizing conditions. On account of these valuable properties, refractory ware made from this material will withstand not only high temperatures but also high temperatures maintained for a considerable period of time and yet the ware will not deform or develop internal strains and stresses as will ware used for the same purposes and formed of clay. Furthermore, it has the advantage over silicon carbide refractories in that when subjected to high temperatures, it will not boil out on the surface and destroy any ceramic wares that are in contact with or proximity to it. It also has the advantage over silicon carbide refractories in that it will not discolor the ceramic ware burned in the containers or kiln furniture made of it.

Sillimanite produces an exceedingly hard crystalline structure. When crushed to the proper sizes, about 14 mesh and run of mill, the needle-like structure is retained by the greater portion of the grains, so that the grains when mixed with water and a small amount of binder, preferably clay or clay and alumina, and tamped into a mould, is readily compressed and packed, since the needle-like grains tend to arrange themselves in parallel relation and thus operate to bind the structure together when the refractory is finally formed. This is also true while the body is in a green state and consequently a smaller amount of binder is required to cause the green bodies to retain their shapes until they are burnt in the kiln.

Under some conditions, particularly where the ware is to be subjected to repeated high temperatures, it is advantageous to use nothing but an organic binder in the manufacture of the ware, in which case the firing of the refractory ware in its formation must be sufficiently high to cause the grains to bind together.

The proper proportioning of grain sizes of the sillimanite and also the proper proportioning of the amount of clay binder (if used) to the amount of the sillimanite is essential. If the particles of sillimanite are separated too much by the binding material, the product is no more refractory than the object would be if it was made entirely of the binder. Again it is essential to govern the amount of fines by the amount of binder used as the binder acts similarly to the fines in filling the spaces between the larger grains so that too much of the fines displace the binder.

In my invention, I preferably form a raw batch consisting of 100% to as low a percent as desired, of sillimanite grains, according to the object to be attained, and the remainder of an aluminous binder such as clay or clay and alumina, in proper proportions to ultimately form sillimanite. The granular sillimanite may contain particles 14 mesh and finer, about 25 to 35% of which may be finer than 100 mesh. The sillimanite grain sizes may be about as follows:—

8 to 20 mesh 40% to 65%. 20 to 40 mesh 27% to 30%. 40 to 100 mesh 6% to 15%. 100 to 120 mesh 2% to 15%.

The clay used may be selected according to the degree of refractoriness required in the finished product, that is, according to the temperature at which the refractory ware is to be used. The clay selected should, however, depend upon the maturing temperature of the combination of the composition of the batch and the desired density to be produced in the product. It is also preferable to use a plastic clay, provided it has the desirable refractory property, since the more plastic the clay is the better the binder it makes in the raw batch, which results in the possible reduction of the amount of an organic binder that might be required if a less plastic clay is used and is to be burned at a relatively low temperature.

If the amount of clay used is insufficient to hold the granular material together until the body has been sufficiently heated, I preferably use an organic binder. The organic binder may be formed of any suitable organic material such as gluten, flour or the like, which will burn out. The amount of the flour used in the formation of the articles preparatory to the firing, may vary from a small amount to 8 per cent of the material of the raw batch. Inasmuch as the organic material is burned out during the early stages of the burning, it forms no part of the finished product.

The refractory body may be heated in a kiln to a temperature preferably above that of the temperature to which the refractory body is to be subjected when in use.

In the formation of the refractory bodies by the semi-plastic process the raw batch is placed in molds and is tamped and is subjected to considerable pressure in the tamping operation. By subjecting the composition in the mold to tamping and to a high pressure, the needle-like crystals of the granular sillimanite interlock or arrange themselves in substantially parallel relation and a portion of the plastic clay and possibly some of the finer particles of the sillimanite is forced to the surface and forms a smooth surface in the refractory body. If sufficient amount of clay is used it will be forced into all of the spaces between the particles of the sillimanite and so that all of the particles will be completely covered by the clay. In other words, the tamping of the composition while in the mold at high pressure, produces a coating around all or a large part of the particles of the sillimanite while the mere mechanical mixture of the particles of the sillimanite with the clay without tamping would result in the formation of a coating over only a major portion of the surfaces of the particles of sillimanite. If the batch contains sillimanite, clay and alumina sufficient in amount, the clay and alumina is forced into covering and binding relation to the particles of sillimanite and also is forced to the surface of the mold so that when the bodies are burned to a sufficiently high temperature sillimanite will be formed of the clay and alumina located around the sillimanite particles of the batch and thus produce a perfect sillimanite adhesion. Furthermore the harder the tamping is done, the closer the particles of the sillimanite are forced together which enables a smaller amount of clay to completely coat and efficiently bind the sillimanite particles or to coat a larger portion of the finely divided material and bind the whole and eliminate the collection of relatively large quantities of clay in parts of the ceramic body. This prevents the development of local stresses and strains and local deformations of the refractory body after it has been fired or during the firing.

When it is desired to form refractory ware to be used at high temperatures, preferably 90% of sillimanite (14 mesh and run of mill) and the balance of refractory clay is used and the ware is formed by tamping the mixture in a mold.

The composition of the raw batch may be modified according to the method of formation of the refractory bodies preparatory to firing. If the bodies are to be cast instead of molded, a greater quantity of plastic clay is added to the material in order to produce a suitable casting slip.

For casting in the liquid state, I find it preferable to use from 60% to 80% of ground sillimanite (18 mesh and run of mill) and the balance of alumina ball clay and china clay in a ratio of about 1 of alumina to 2.53 of clays.

The following formula of aluminous materials is suitable for casting:—

|  | Per cent |
|---|---|
| Sillimanite (18 mesh and finer) | 60 |
| Calcined alumina | 11.0 |
| English ball clay | 9.3 |
| North Carolina kaolin | 19.7 |

To this is added water and the salts commonly used in ceramic casting.

I have thus produced by my invention an exceedingly refractory body which has a high thermal conductivity and will not deform when subjected to high temperatures and is consequently valuable when used in ceramic work and where ceramic bodies are to be subjected to repeated thermal changes.

I claim:—

1. A raw batch for refractory bodies, comprising a mixture of refractory granules, clay and a sufficient amount of alumina to combine with substantially all of the silica of the clay to form sillimanite of the clay and alumina.

2. A raw batch for refractory bodies, comprising, as the chief ingredient, refractory granules, and, as bonding material for the granules, a mixture richer in alumina than is clay.

3. A raw batch for refractory bodies, comprising finely divided sillimanite, clay and another aluminous material.

4. A raw batch for refractory bodies, comprising finely divided sillimanite, clay and alumina.

5. A raw batch for refractory bodies, comprising finely divided sillimanite and sufficient clay to coat substantially all of the particles of sillimanite when the composition is compressed, the clay constituting not over thirty percent of the batch.

6. A raw batch for refractory bodies, comprising a mixture of finely divided sillimanite and clay sufficient in amount to cover the exterior of the body and to coat substantially all of the particles of the sillimanite when compressed, the clay constituting not over thirty percent of the batch.

7. A raw batch for refractory bodies, comprising finely divided sillimanite and sufficient clay and another aluminous material to completely coat the particles of sillimanite when the composition is compressed.

8. A raw batch for refractory bodies, comprising a mixture of finely divided sillimanite and clay and another aluminous material sufficient in amount to coat substantially all of the particles of the sillimanite and to cover the exterior of the body when compressed.

9. A raw batch for refractory bodies comprising a mixture of finely divided sillimanite, clay and a sufficient amount of alumina to combine with substantially all of the silica of the clay to form sillimanite of the clay and alumina.

10. The method of forming a refractory body, which consists in mixing finely divided sillimanite in a moist condition, compressing the composition to force the crystals of sillimanite together and subjecting the formed body to a temperature as high as that at which the refractory body is to be used.

11. The method of forming a refractory body, which consists in mixing finely divided sillimanite and a binder in a moist condition, compressing the composition to force the crystals of sillimanite together, and subjecting the formed body to a temperature as high as that at which the refractory body is to be used.

12. The method of forming a refractory body, which consists in mixing finely divided sillimanite and clay, the clay being no more in amount than that required to cover the surface of the body and to coat substantially all of the particles of the sillimanite, compressing the composition to force the particles of the sillimanite together and to force the clay to the surface of the body and subjecting the formed body to a temperature as high as that at which the refractory body is to be used.

13. The method of forming a refractory body, which consists in mixing finely divided sillimanite and clay and another aluminous material, the clay and said aluminous material being no more in amount than that required to cover the surface of the body and to coat substantially all of the particles of the sillimanite, compressing the composition to force the particles of the sillimanite together and to force the combination of clay and the other aluminous material to the surface of the body and subjecting the formed body to a temperature as high as that at which the refractory body is to be used.

14. The process of forming a refractory body which consists in mixing granular sillimanite with clay and alumina and subjecting the mixture to a sufficient temperature to form the clay and alumina into sillimanite.

15. The process of forming a refractory body which consists in mixing granular refractory material with bonding material containing available silica and alumina in a proportion nearer to their proportion in sillimanite than is their proportion in clay, shaping the mixture into articles, and firing the articles to a sufficient temperature to form sillimanite of said available alumina and silica.

16. The process of manufacturing a ceramic article comprising the steps of mixing granular refractory material with a bond containing available silica and alumina in substantially moleculr proportions to form a compound of the formula $xAl_2O_3 \cdot ySiO_2$, molding the mixture thus obtained to the desired shape and firing the shaped article at a high temperature to convert the major portion of the silica and alumina to a fibrous compound of such formula and bond the refractory granules therewith.

17. A refractory body comprising sillimanite particles and calcined clay and alumina.

18. A ceramic article comprising super-refractory grains in graded sizes serving as the chief refractory ingredient thereof which are united into an integral mass by a relatively small amount of bond located in the interstices between the grains, the major portion of which is a synthetic sillimanite of the formula $xAl_2O_3 \cdot ySiO_2$.

19. A ceramic article comprising super-refractory grains forming the major portion thereof which are united into an integral mass by a bond located in the interstices between the grains, substantially all of said bond consisting of a compound of the formula $xAl_2O_3.ySiO_2$, formed in situ by heating alumina and silica bearing materials so proportioned as to produce said compound and a small amount of glassy matrix residue from said materials.

20. A ceramic article comprising super-refractory grains in graded sizes serving as the chief refractory ingredient thereof, which are united into an integral mass by a relatively small amount of bond located in the interstices between the grains, the bond consisting of calcined clay and alumina.

In testimony whereof I have hereunto signed my name to this specification.

FRANK H. RIDDLE.